US008982480B2

United States Patent
Tilleman et al.

(10) Patent No.: US 8,982,480 B2
(45) Date of Patent: Mar. 17, 2015

(54) SYSTEM AND METHOD FOR ADJUSTING A PROJECTED IMAGE

(75) Inventors: Michael M. Tilleman, Arlington, MA (US); Richard S. Wolfe, Londonderry, NH (US); Vladimir G. Krylov, Brookline, NH (US); Martin M. Cielinski, Hollis, NH (US); Tomer Eshed, Hollis, NH (US)

(73) Assignee: Elbit Systems of America, LLC, Fort Worth, TX (US)

( * ) Notice: Subject to any disclaimer, the term of this patent is extended or adjusted under 35 U.S.C. 154(b) by 765 days.

(21) Appl. No.: 12/974,578

(22) Filed: Dec. 21, 2010

(65) Prior Publication Data

US 2011/0157707 A1    Jun. 30, 2011

Related U.S. Application Data

(60) Provisional application No. 61/290,827, filed on Dec. 29, 2009.

(51) Int. Cl.
*G02B 17/00* (2006.01)
*G03B 21/14* (2006.01)
*G03B 21/28* (2006.01)

(52) U.S. Cl.
CPC ............... *G03B 21/14* (2013.01); *G03B 21/28* (2013.01)
USPC ........................................................ 359/726

(58) Field of Classification Search
USPC ................. 359/642, 726, 630–633, 636–638
See application file for complete search history.

(56) References Cited

U.S. PATENT DOCUMENTS

| 4,348,186 | A |   | 9/1982  | Harvey et al. ................. 434/44 |
| 4,588,382 | A |   | 5/1986  | Peters ............................ 434/44 |
| 4,634,384 | A | * | 1/1987  | Neves et al. .................... 434/44 |
| 5,805,119 | A |   | 9/1998  | Erskine et al. .................. 345/7 |
| 5,978,128 | A |   | 11/1999 | Yoon ............................ 359/298 |
| 6,594,090 | B2 |  | 7/2003  | Kruschwitz et al. .......... 359/707 |
| 6,874,894 | B2 |  | 4/2005  | Kitamura ..................... 353/97 |
| 6,955,436 | B2 |  | 10/2005 | Watanabe ..................... 353/122 |
| 7,271,960 | B2 |  | 9/2007  | Stewart et al. ................ 359/630 |

(Continued)

FOREIGN PATENT DOCUMENTS

EP    0 927 903 B1    10/2002    ............. G02V 26/08
GB    2 259 213        3/1993     ............... G09B 9/32

(Continued)

OTHER PUBLICATIONS

Michael M. Tilleman et al., *System and Method for Efficiently Delivering Rays From a Light Source to Create an Image*, U.S. Appl. No. 12/981,137, filed Dec. 29, 2010, (65 pgs.).

(Continued)

*Primary Examiner* — James Greece

(57) ABSTRACT

In accordance with one embodiment of the present disclosure, a system comprises a projection system. The system further includes an image generator disposed in the projection system. The image generator is operable to generate a plurality of rays. The system further includes an objective lens disposed in the projection system. The objective lens is operable to refract the plurality of rays. The system further includes a component operable to reflect the refracted rays onto a target in order to form an image. The image is operable to be moved in relation to the target. The movement of the image is independent of any displacement of the projection system in relation to the target.

26 Claims, 4 Drawing Sheets

(56) References Cited

U.S. PATENT DOCUMENTS

| | | | |
|---|---|---|---|
| 7,377,652 B2 | 5/2008 | Whitehead et al. | 353/30 |
| 7,405,856 B2 | 7/2008 | Doherty et al. | 359/245 |
| 7,413,309 B2 | 8/2008 | Whitehead et al. | 353/30 |
| 2005/0012682 A1* | 1/2005 | Jenson et al. | 345/7 |
| 2008/0218438 A1 | 9/2008 | Aral et al. | 345/55 |
| 2009/0128901 A1 | 5/2009 | Tilleman et al. | 359/475 |
| 2009/0243963 A1 | 10/2009 | Hotta et al. | |

FOREIGN PATENT DOCUMENTS

| | | |
|---|---|---|
| JP | S62-149435 | 9/1987 |
| JP | 2000-305482 | 11/2000 |
| JP | 2002-090879 | 3/2002 |
| JP | 2003-341383 | 12/2003 |
| JP | 2004-279847 | 10/2004 |
| JP | 2005-208136 | 8/2005 |
| JP | 2005-221980 | 8/2005 |
| JP | 2006-178473 | 7/2006 |
| JP | 2007-052086 | 3/2007 |

OTHER PUBLICATIONS

Michael M. Tilleman et al., *System for Efficiently Delivering Rays From a Light Source to Create an Image*, U.S. Appl. No. 61/292,110, filed Jan. 4, 2010, (35 pgs.).

Notification of Transmittal of the International Search Report and the Written Opinion of the International Searching Authority, or the Declaration; International Application No. PCT/US2010/062213; International Filing Date Dec. 28, 2010, Date of Mailing Mar. 11, 2011.

European Patent Office Communication, Application No. 10 800 867.3, mailed Nov. 8, 2013.

Japanese Office Action, Application No. 2012-547235, mailed Sep. 2, 2014.

\* cited by examiner

SYSTEM AND METHOD FOR ADJUSTING A PROJECTED IMAGE

RELATED APPLICATION

This application claims the benefit under 35 U.S.C. §119(e) of the priority of U.S. Provisional Application No. 61/290,827 filed Dec. 29, 2009, entitled "System for Adjusting a Projected Image."

TECHNICAL FIELD

This disclosure relates in general to image projectors and more particularly to a system and method for adjusting a projected image.

BACKGROUND

Typically, image projectors are used for the projection of synthetic images on various objects. As such, the images may be observed within a field-of-view. Such image projectors, however, are deficient because they require a certain predetermined projection space in order to be used.

SUMMARY OF THE DISCLOSURE

In accordance with one embodiment of the present disclosure, a system comprises a projection system. The system further includes an image generator disposed in the projection system. The image generator is operable to generate a plurality of rays. The system further includes an objective lens disposed in the projection system. The objective lens is operable to refract the plurality of rays. The system further includes a component operable to reflect the refracted rays onto a target in order to form an image. The image is operable to be moved in relation to the target. The movement of the image is independent of any displacement of the projection system in relation to the target.

Numerous technical advantages are provided according to various embodiments of the present disclosure. Particular embodiments of the disclosure may exhibit none, some, or all of the following advantages depending on the implementation. In certain embodiments, a projection system may rotate, steer and/or refocus a projected image independent of having to adjust or move the entire projection system in relation to a target. As such, a user may be free to dispose the projection system in a lax alignment relative to a target and still be able to have the projected image fall on the target, become erect, and become well focused. Furthermore, the projection system may be deployable in various compartments predominantly independent of space constraints.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1 through 4 of the drawings, like numerals being used for like and corresponding parts of the various drawings.

Figure 1:
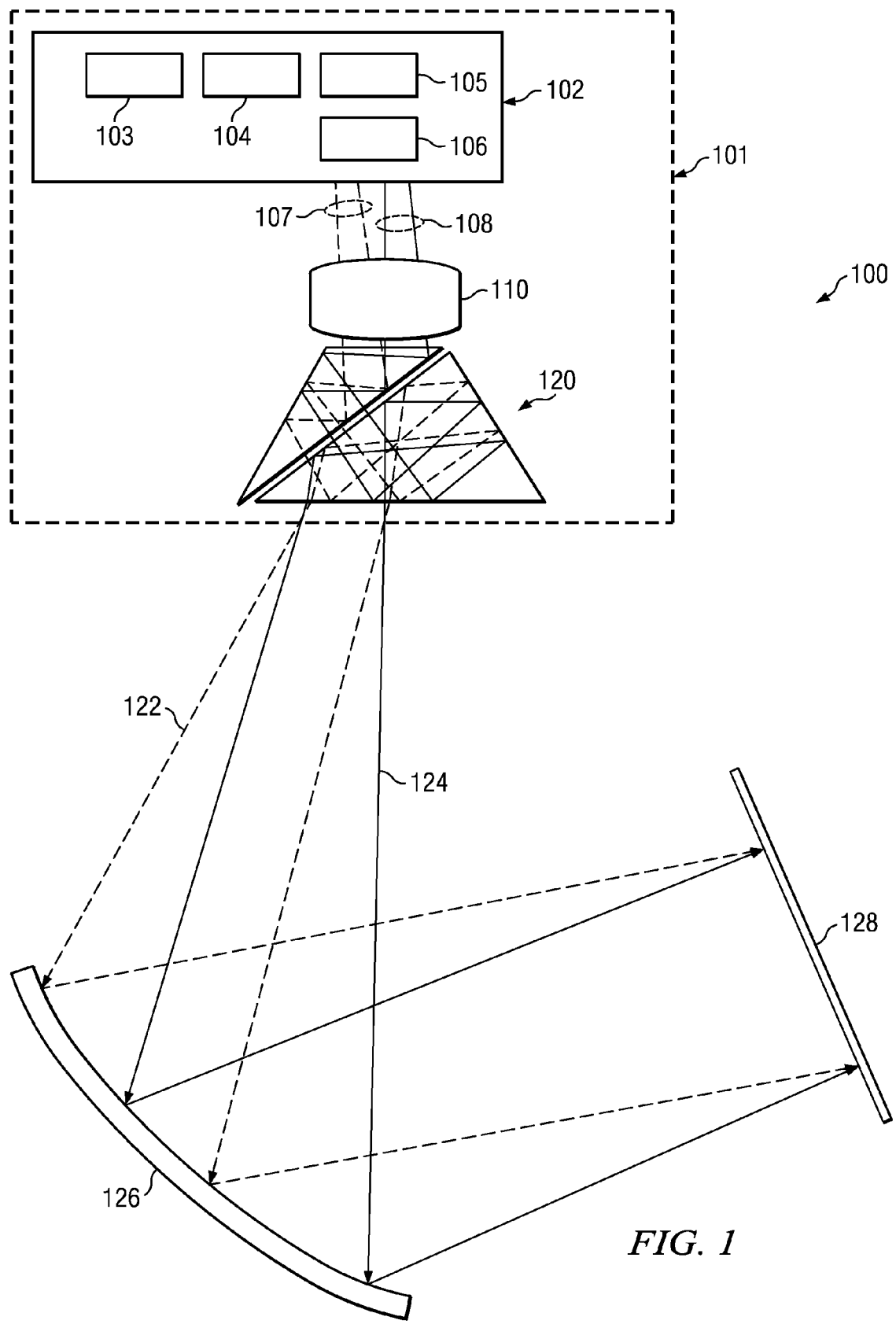
FIG. 1 is a diagram illustrating one embodiment of a system for rotating a projected image.

FIG. 1 is a diagram illustrating one embodiment of a system 100 for rotating a projected image. In one embodiment, the system 100 includes an image rotating prism 120 disposed in a projection system 101. The rotating prism 120 may allow a projected image to be rotated. As such, the image may be aligned on a target 128 so as to produce an erect image or, in another embodiment, the image may be aligned at an arbitrary angle. Additionally, the projected image may be rotated independent of angular roll disposition of the entire projection system 101 relative to the target 128.

In one embodiment, the system 100 may be a projector. In one embodiment, the term "projector" may refer to any combination of an image generating system 102, an objective lens 110, the rotating prism 120, a component 126, and the target 128. In further embodiments, the term "projector" may refer to additional components, different components, and/or any other combination of the referenced components.

According to the illustrated embodiment, the system 100 includes the projection system 101, the component 126, and the target 128. In one embodiment, the projection system 101 may include various dimensions enabling the projection system 101 to be used in small spaces. In one embodiment, the dimensions of the projection system 101 may include 120×75×65 mm. In further embodiments, the dimensions may be greater than 120×75×65 mm, or less than 120×75×65 mm. In yet another embodiment, the projection system 101 may be a Head-Up Display (HUD) projection system. In a further embodiment, the projection system 101 may be a Helmet-Mounted Display (HMD) projection system.

According to the illustrated embodiment, the projection system 101 includes the image generating system 102, the objective lens 110, and the rotating prism 120. In one embodiment, the image generating system 102 may include an illumination source 103, one or more optical elements 104, an image generator 105, and one or more additional optical elements 106. According to one embodiment, the illumination source 103 may generate light propagating through the one or more optical elements 104 to the image generator 105, and the one or more additional optical elements 106 may propagate electromagnetic radiation from the image generator 105 to the objective lens 110. In one embodiment, the illumination source 103 may be a narrow spectral source, such as a laser. In a further embodiment, the illumination source 103 may be a broad spectral source, such a light emitting diode (LED).

In one embodiment, the image generator 105 may include a spatial modulator. In another embodiment, the image generator 105 may emit electromagnetic radiation. In a further embodiment, the image generator 105 may emit electromagnetic radiation in a visible range so as to project an image. In yet another embodiment the illumination source 103 may emit electromagnetic radiation in a visible range so as to project an image. For example, the emitted electromagnetic radiation may be at a visible wavelength between 400 and 700 nm with a broadband spectrum of approximately 50 nm FWHM (Full-Width Half-Maximum). In one embodiment the emitted electromagnetic radiation may be at a visible wavelength between 400 and 700 nm with a narrowband spectrum of less than a picometer to a few nanometers. According to the illustrated embodiment, the electromagnetic radiation propagating from the image generator 105 may be referred to as rays 107 and 108. Furthermore, although the illustrated embodiment includes two rays 107 and 108, the image generator 105 may emanate more than two rays, or less than two rays. In one embodiment, the rays 107 and 108 may originate at the image generator 105 and periphery.

Objective lens 110 may include any lens that receives the rays 107 and 108 propagating from the image generator 105. In one embodiment, the objective lens 110 may include a single lens. In a further embodiment, the objective lens 110 may include multiple lenses arranged as a lens group. In another embodiment, the objective lens 110 may include any combination of lenses, singlet lens elements, prisms, and/or diffractive elements. According to the illustrated embodiment, the objective lens 110 includes a lens group. In one embodiment, after receiving the rays 107 and 108, the objective lens 110 may pass the rays 107 and 108 to the rotating prism 120. According to additional embodiments, the objective lens 110 refracts the rays 107 and 108, diffracts the rays 107 and 108, or adjust the rays 107 and 108 in any way. For example, in one embodiment, the objective lens 110 may magnify the rays 107 and 108 so that the image projected by the system 100 may be enlarged so as to be viewed by a user.

Rotating prism 120 may include any device for rotating the rays 107 and 108, resulting in the rotation of an image. For example, the rotating prism 120 may include a Pechan prism, a dove prism, Abbe prism, Abbe-Koenig prism, Schmidt (or delta) prism, right-angle prism, penta prism, Porro prism, any other suitable prism, or any combination thereof. According to the illustrated embodiment, the rotating prism 120 includes a Pechan prism. In another embodiment, the rotating prism 120 may reflect incident light. In such an embodiment, the rotating prism 120 may be achromatic.

According to the illustrated embodiment, the rotating prism 120 may be disposed in the projection system 101 past the objective lens 110. For example, the rotating prism may be disposed between the objective lens 110 and the component 126. As such, the rotating prism 120 may be able to rotate the rays 107 and 108, resulting in rotation of the projected image. In one embodiment, the projected image may be rotated when the rotating prism 120, itself, is rotated. For example, the rotating prism 120 may be rotated around line 124 of the system 100. In such an embodiment, a rotation of the rotating prism 120 by an angle θ causes the rays 107 and 108 to be rotated, resulting in the image being rotated by an angle of 2θ. In one embodiment, an angle θ may refer to any angle, such as an angle ranging from 0° through 180°. According to the illustrated embodiment, the rotated rays 107 and 108 emerging from the rotating prism 120 may be referred to as optical rays 122 and 124.

In one embodiment, the rotating prism 120 may be rotated in any suitable manner. For example, the rotating prism 120 may be mechanically coupled to one or more mechanisms, such as a motor, included on the projection system 101. As such, a user may manipulate the mechanisms in order to cause the rotating prism 120 to rotate. In further embodiments, the rotating prism 120 may be rotated in any other way. For example, rotation of the rotating prism 120 may be initiated by a switch, a button, or a rotatable bar. In a further embodiment, the rotation of rotating prism 120 may be controlled electronically by another device, such as, for example, a computer.

As is discussed above, according to the illustrated embodiment, the system 100 further includes the component 126 and the target 128. Component 126 may include any combiner for receiving the optical rays 122 and 124 and subsequently reflecting them to the target 128 in order to create an image that may be viewed by a user. In one embodiment, the component 126 may include a partially reflective coating on its concave surface through which a user may observe a synthetic image overlaying the transmitted environs. In a further embodiment, the component 126 may include a dioptrically powered element. In yet another embodiment the component 126 may include a diffractive powered element. In such an embodiment, the component 126 and the objective lens 110 may work together so as to form a catadioptric imaging unit. According to the illustrated embodiment, the component 126 may constitute a reflective eyepiece that collimates the optical rays 122 and 124.

In a further embodiment, the component 126 may have a coating on its outward, surface (with respect to the image generator 105) in addition to the coating on its inward surface (with respect to the image generator 105). In one embodiment, the coating on the inward surface may have a spectrally preferential reflectivity so as to predominantly reflect a desired fraction of the projected illumination and predominantly transmit light from the surroundings, and the coating on the outward surface may have a minimum reflectivity (known in the art as anti-reflective coating) so as to predominantly transmit light from the surroundings. In one embodiment, the spectrally preferential reflectivity of the component 126 may result in the partial reflection of the projected illumination at a visible wavelength of 525 nm with a broadband spectrum of approximately 50 nm FWHM, while the component 126 may also be partially transmissive anywhere within the entire visible spectrum (thus allowing outer scenery images having any wavelength in the entire visible spectrum to be transmitted). In an additional embodiment, the spectrally preferential reflectivity of the component 126 may result in the partial reflection of the projected illumination at any wavelength within the entire visible spectrum, while the component 126 may also be partially transmissive anywhere within the entire visible spectrum. In such an embodiment, the spectrally preferential reflectivity and the minimum reflectivity of the component 126 may be complementary. In a further embodiment, the spectrally preferential reflectivity of the component 126 may result in the simultaneous partial reflection of projected illumination at multiple different bandwidths, such as, for example, 480 nm, 525 nm, and 650 nm. In one embodiment, the anti-reflective coating may allow one or more outer scenery images (from the surroundings) to be transmitted, and may further eliminate one or more ghost images. Accordingly, component 126 may form an overlapped image of the outer scenery and the generated image on the target. In a further embodiment where the image generator 105 emits a polarized optical beam, the coating on the inward surface may have a polarization preferential reflectivity so as to predominantly reflect a desired fraction of the projected polarized illumination and predominantly transmit light from the surroundings, and the coating on the outward surface may have the anti-reflective coating so as to predominantly transmit light from the surroundings. In such an embodiment, the projection system 101 may further include a polarization compensator disposed past the rotating prism 120 to compensate for the rotating prism 120 modulating the polarization as a function of the rotation angle.

Target 128 may include any device that allows the optical rays 122 and 124 to be viewed as an image. In one embodiment, the target 128 may include a lens, a screen, a blank wall, a user's eye, or any other suitable device for receiving the optical rays 122 and 124 from the component 126. According to the illustrated embodiment, the target 128 may be a locus known in the art as eyebox. In a further embodiment, the target 128 may further focus the optical rays 122 and 124 received from the component 126 into an image that may be viewed by a user. In a further embodiment, the target 128 may allow a user to view the rotated image.

As described above, the rotating prism 120 may allow for the projected image to be rotated. In a further embodiment, the image generator 105 may also allow the image to be rotated. For example, the image generator 105 may virtually rotate the pixels of the projected image, so as to cause the projected image to be rotated. In such an example, the image generator 105 may reassign the pixels of the projected image by attributing values to the pixels using electronic assignment. As a further example, the image generator 105 (or a spatial modulator) may be rotatable so as to cause the projected image to be rotated. Accordingly, in one embodiment, the image may be rotated by rotating either the image generator 105, the rotating prism 120, or both. For example, according to one embodiment, the image generator 105 may remain steady while the rotating prism 120 is rotated so as to result in the rotated image. In a further embodiment, the rotating prism 120 may remain steady while the image generator 105 is rotated so as to result in the rotated image. In one embodiment, by rotating the projected image using either the rotating prism 120 or the image generator 105, the projected image may be rotated independent of angular roll disposition of the entire projection system 101.

Modifications, additions, or omissions may be made to the system 100 without departing from the scope of the invention. The components of the system 100 may be integrated or separated. Moreover, the operations of the system 100 may be performed by more, fewer, or other components. For example, the operations of the rotating prism 120 may be performed by more than one component. As used in this document, "each" refers to each member of a set or each member of a subset of a set.

Figure 2:
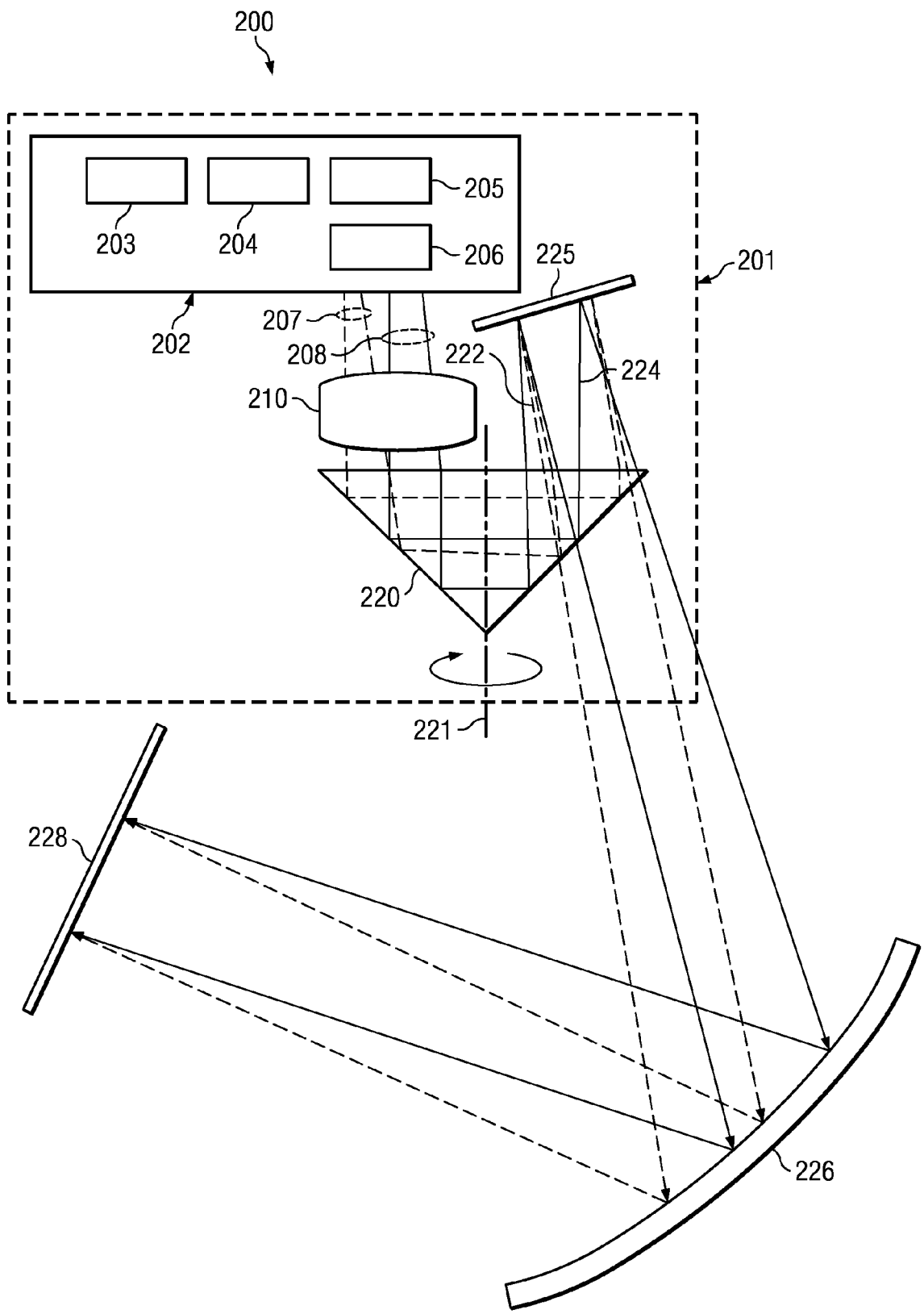
FIG. 2 is a diagram illustrating a further embodiment of a system for rotating and steering a projected image.

FIG. 2 is a diagram illustrating one embodiment of a system 200 for rotating and steering a projected image. In one embodiment, the system 200 may include a steering mirror 225 disposed in a projection system 201. The steering mirror 225 may allow a projected image to be steered so as to place the projected image on a target 228, or in a particular spot on the target 228. As such, the system 200 may project an image on the target 228 even when the target 228 has initially not been in the field-of-view of the projection system 201. Furthermore, the projected image may be moved without displacing the entire projection system 201.

In one embodiment, the system 200 may be a projector. In one embodiment, the term "projector" may refer to any combination of an image generating system 202, an objective lens 210, a rotating prism 220, the steering mirror 225, a component 226, and the target 228. In further embodiments, the term "projector" may refer to additional components, different components, and/or any other combination of the referenced components.

According to the illustrated embodiment, the system 200 includes the projection system 201, the component 226, and the target 228. In one embodiment, the projection system 201 of FIG. 2 is similar to the projection system 101 of FIG. 1, the component 226 of FIG. 2 is similar to the component 126 of FIG. 1, and the target 228 of FIG. 2 is similar to the target 128 of FIG. 1. In one embodiment, the projection system 201 may include various dimensions enabling the projection system 201 to be used in small spaces. In one embodiment, the dimensions of the projection system 201 may include 120× 75×65 mm. In further embodiments, the dimensions may be greater than 120×75×65 mm, or less than 120×75×65 mm. In yet another embodiment, the projection system 201 may be a Head-Up Display (HUD) projection system. In a further embodiment, the projection system 201 may be a Helmet-Mounted Display (HMD) projection system.

According to the illustrated embodiment, the projection system 201 includes the image generating system 202, illumination source 203, one or more optical elements 204, image generator 205, one or more additional optical elements 206, objective lens 210, rotating prism 220, and the steering mirror 225. In one embodiment, the image generating system 202 of FIG. 2 is similar to the image generating system 102 of FIG. 1, the illumination source 203 of FIG. 2 is similar to the illumination source 103 of FIG. 1, the one or more optical elements 204 of FIG. 2 are similar to the one or more optical elements 104 of FIG. 1, the image generator 205 of FIG. 2 is similar to the image generator 105 of FIG. 1, the one or more additional optical elements 206 of FIG. 2 are similar to the one or more additional optical elements 106 of FIG. 1, and the objective lens 210 of FIG. 2 is similar to the objective lens 110 of FIG. 1. According to the illustrated embodiment, FIG. 2 further illustrates rays 207 and 208, and optical rays 222 and 224. In one embodiment, the rays 207 and 208 of FIG. 2 are similar to the rays 107 and 108 of FIG. 1, and the optical rays 222 and 224 of FIG. 2 are similar to the optical rays 122 and 124 of FIG. 1.

As discussed above, the projection system 201 further includes a rotating prism 220 and the steering mirror 225. In one embodiment, the rotating prism 220 of FIG. 2 is similar to the rotating prism 120 of FIG. 1. As such, the rotating prism 220 may include any device for rotating the rays 207 and 208, resulting in the rotation of an image, as is described in FIG. 1. Furthermore, the rotating prism 220 may include any suitable prism, as is also described in FIG. 1. According to the illustrated embodiment, the rotating prism 220 may include a Porro prism. In a further embodiment, the rotating prism 220 may be situated so that the optical rays 222 and 224 emerge from the rotating prism 220 and propagate to the steering mirror 225. In such an embodiment, the optical rays 222 and 224 may emerge from the rotating prism 220 at approximately 180° with respect to the rays 207 and 208. In other embodiments, the optical rays 222 and 224 may emerge from the rotating prism 220 at any other suitable degree with respect to the rays 207 and 208.

Steering mirror 225 may include any suitable device for reflecting the optical rays 222 and 224 towards the component 226. For example, the steering mirror 225 may include a flat mirror disposed between the rotating prism 220 and the component 226. In further embodiments, the steering mirror 225 may include any other suitable reflective device, and may be located anywhere in the projection system 201 where the steering mirror 225 may reflect the optical rays 222 and 224 towards the component 226.

According to the illustrated embodiment, the steering mirror 225 may be adjustable so as to change the direction in which the optical rays 222 and 224 propagate. For example, the steering mirror 225 may be adjustable in two angular degrees of freedom: pitch and yaw. In such an embodiment, the steering mirror 225 may be adjusted to any suitable angle of pitch and/or yaw so as to change the angle at which the optical rays 207 and 208 are reflected towards the component 226. Accordingly, in one embodiment, by adjusting the steering mirror 225, the optical rays 207 and 208 may be steered to a different location on the component 226, causing the image to be steered to a different location on the target 228. As a result, the steering mirror 225 may allow the projected image to be moved in a vertical and/or horizontal direction. In one embodiment, this may allow the projection system 201 to project an image on the target 228 even when the target 228 has initially not been in the field-of-view of the projection system 201, or to move the projected image to a different location on the target 228.

In one embodiment, the steering mirror 225 may be adjusted in any suitable manner. For example, the steering mirror 225 may be mechanically coupled to one or more mechanisms, such as a motor, included on the projection system 201. As such, a user may activate the mechanisms in order to adjust the steering mirror 225. In further embodiments, the steering mirror 225 may be adjusted in any other way. For example, the steering mirror 225 may be adjusted by a switch, a button, or an adjustable bar. In a further embodiment, the adjustment of the steering mirror 225 may be controlled electronically by another device, such as, for example, a computer.

Modifications, additions, or omissions may be made to the system 200 without departing from the scope of the invention. The components of the system 200 may be integrated or separated. Moreover, the operations of the system 200 may be performed by more, fewer, or other components. For example, the operations of the steering mirror 225 may be performed by more than one component.

Figure 3:
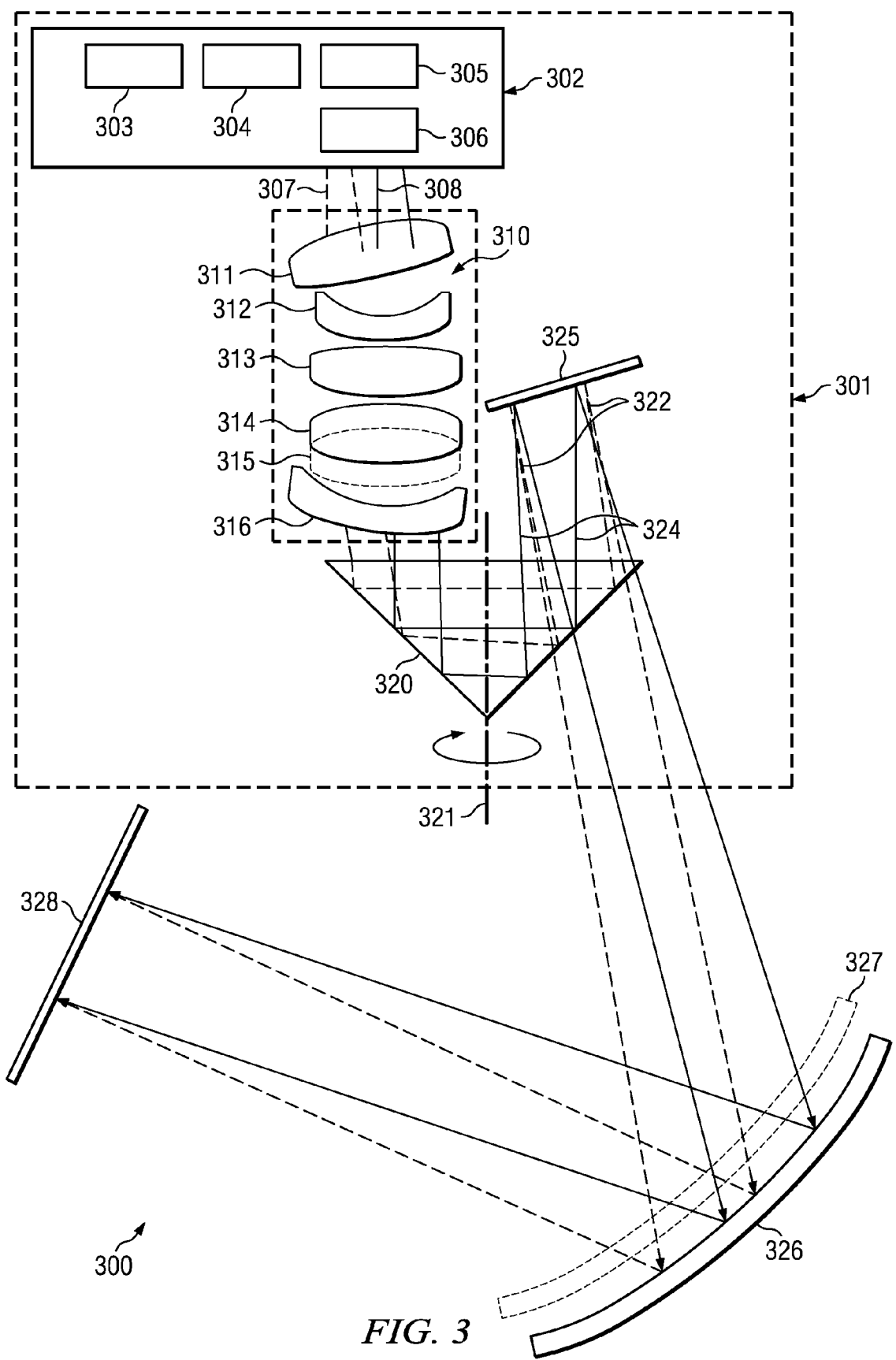
FIG. 3 is a diagram illustrating another embodiment of a system with a zoom lens for rotating, steering, and focusing a projected image.

FIG. 3 is a diagram illustrating one embodiment of a system 300 with a zoom lens for rotating, steering, and focusing a projected image. In one embodiment, the system 300 includes an objective lens 310 disposed in the projection system 301. The objective lens 310 may be adjusted in order to refocus an image projected onto a target 328. As such, an in-focus image may be formed at the target 328 independent of the distance between the objective lens 310 and a component 326.

According to the illustrated embodiment, the system 300 includes the projection system 301, the component 326, and the target 328. In one embodiment, the projection system 301 of FIG. 3 is similar to the projection system 201 of FIG. 2, the component 326 of FIG. 3 is similar to the component 226 of FIG. 2, and the target 328 of FIG. 3 is similar to the target 228 of FIG. 2. In one embodiment, the projection system 301 may include various dimensions enabling the projection system 301 to be used in small spaces. In one embodiment, the dimensions of the projection system 301 may include 120× 75×65 mm. In further embodiments, the dimensions may be greater than 120×75×65 mm, or less than 120×75×65 mm. In yet another embodiment, the projection system 301 may be a Head-Up Display (HUD) projection system. In a further embodiment, the projection system 301 may be a Helmet-Mounted Display (HMD) projection system.

According to the illustrated embodiment, the projection system 301 includes the image generating system 302, illumination source 303, one or more optical elements 304, image generator 305, one or more additional optical elements 306, objective lens 310, and steering mirror 325. In one embodiment, the image generating system 302 of FIG. 3 is similar to the image generating system 202 of FIG. 2, the illumination source 303 of FIG. 3 is similar to the illumination source 203 of FIG. 2, the one or more optical elements 304 of FIG. 3 are similar to the one or more optical elements 204 of FIG. 2, the image generator 305 of FIG. 3 is similar to the image generator 205 of FIG. 2, the one or more additional optical elements 306 of FIG. 3 are similar to the one or more additional optical elements 206 of FIG. 2, and the steering mirror 325 of FIG. 3 is similar to the steering mirror 225 of FIG. 2. According to the illustrated embodiment, FIG. 3 further illustrates rays 307 and 308, and optical rays 322 and 324. In one embodiment, the rays 307 and 308 of FIG. 3 are similar to the rays 207 and 208 of FIG. 2, and the optical rays 322 and 324 of FIG. 3 are similar to the optical rays 222 and 224 of FIG. 2.

As discussed above, the projection system 301 further includes the objective lens 310. In one embodiment, the objective lens 310 of FIG. 3 is similar to the objective lens 210 of FIG. 2. In one embodiment, the objective lens 310 may include more than one lens. In a further embodiment, the objective lens 310 may include any combination of lenses, singlet lens elements, prisms, and/or diffractive elements. According to the illustrated embodiment, the objective lens 310 includes singlet lens elements 311, 312, 313, 314 and 316. In one embodiment, the singlet lens elements 311, 312, 313, 314 and 316 are made of transparent materials matching so as to compensate for optical aberrations such as spherical and chromatic aberrations as well as coma, astigmatism, field and distortion. In one embodiment, one or more of the singlet lens elements 311, 312, 313, 314 and 316 may be arranged off axis relative to the chief ray, i.e. the ray that coincides with the symmetry line of the objective lens 310 and the rotating prism 320, while the others may be inclined relative to the chief ray.

According to the illustrated embodiment, one of the singlet lens elements 311, 312, 313, 314 and 316 may be translatable along the optical axis of the system 300 in order to allow for refocusing the image projected on the target 328. For example, the singlet lens element 314 may be translatable along the optical axis to the shown position 316. As such, the objective lens 310 may be a zoom-lens system. In one embodiment, having such a zoom capability may allow the objective lens 310 to compensate for a wide range of misalignment. For example, in one embodiment, the objective lens 310 may be able to compensate for misalignment within the range of 0.1× through 6×. In another embodiment the objective lens 310 may be used to compensate for thermal deformation thus rendering the system athermal. In further embodiments, the objective lens 310 may be able to compensate for misalignment less than 0.1×, or greater than 6×.

According to one embodiment, positioning the singlet lens element 314 to position 316 may cause the system 300 to be compensated when the component 326 is displaced to position 327. As such, an in-focus image may be formed at the target 328 independent of the distance between the objective lens 310 and the component 326. In one embodiment, the objective lens 310 and the component 326 may be a catadioptric system, and in other embodiments, may be a zoom catadioptric system.

Although FIG. 3 illustrates the singlet lens element 314 as being translatable, in certain embodiments, any of the singlet lens elements 311, 312, 313, 314 and 316 may be translatable. Furthermore, more than one of the singlet lens elements 311, 312, 313, 314 and 316 may be translatable.

As discussed above, the objective lens 310 may be adjusted in order to refocus an image projected onto the target 328. In one embodiment, the objective lens 310 may be adjusted in any suitable manner. For example, the objective lens 310 (or one or more of the singlet lens elements 311, 312, 313, 314, and 316) may be mechanically coupled to one or more mechanisms, such as a motor, included on the projection system 301. As such, a user may activate the mechanisms in order to adjust the objective lens 310. In further embodiments, the objective lens 310 may be adjusted in any other way. For example, the objective lens 310 may be adjusted by a switch, a button, or an adjustable bar. In a further embodiment, the adjustment of the objective lens 310 may be controlled electronically by another device, such as, for example, a computer.

Modifications, additions, or omissions may be made to the system 300 without departing from the scope of the invention. The components of the system 300 may be integrated or separated. Moreover, the operations of the system 300 may be performed by more, fewer, or other components. For example, the operations of the steering mirror 325 may be performed by more than one component.

Figure 4:
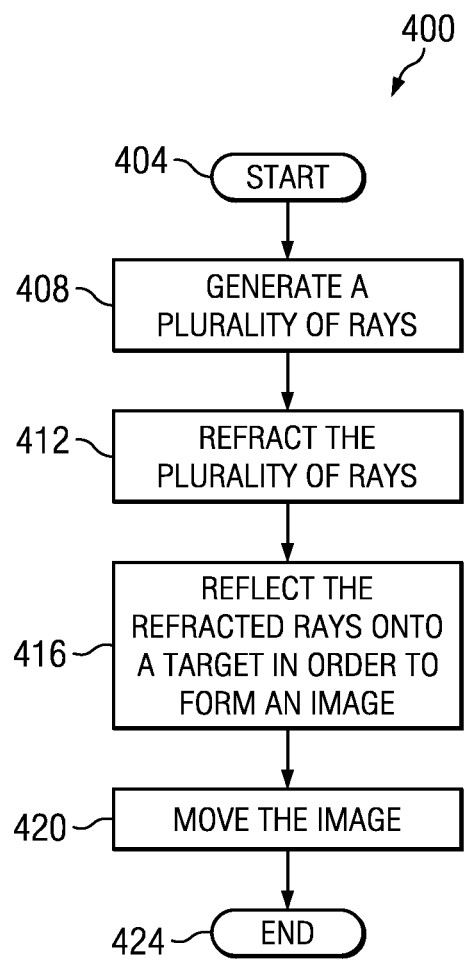
FIG. 4 is a flowchart illustrating a method for moving a projected image.

FIG. 4 is a flowchart illustrating an example method 400 for moving a projected image. In one embodiment, the method 400 may be performed by a system, like system 100 of FIG. 1, system 200 of FIG. 2, and system 300 of FIG. 3. In further embodiments, the system may include a projection system. The projection system may be a HUD.

The method begins at step 404. At step 408, a plurality of rays are generated. In one embodiment, the plurality of rays may be generated by an image generator. In a further embodiment, the plurality of rays may be generated by an image generator disposed in a projection system. In another embodiment, the generated rays may be electromagnetic radiation in a visible range so as to project an image. In another embodiment, the rays may be generated by the image generator in conjunction with an illumination source the generates light, one or more source optics that provide the light to the image generator, and one or more generator optics that provide the rays to an objective lens.

At step 412, the plurality of rays are refracted. In one embodiment, the plurality of rays may be refracted by an objective lens. In another embodiment, the plurality of rays may be refracted by an objective lens disposed in the projection system. In one embodiment, the objective lens may include multiple lenses arranged as a lens group. In another embodiment, the objective lens may include any combination of lenses, singlet lens elements, prisms, and/or diffractive elements. In a further embodiment, the objective lens may include a lens group. In one embodiment, the plurality of rays may be further altered in any suitable manner. For example, the rays may be diffracted or adjusted in any way. As another example, the rays may be magnified so that the projected image may be enlarged so as to be viewed by a user.

At step 416, the refracted rays are reflected onto a target in order to form an image. In one embodiment, the refracted rays may be reflected onto the target by a component. In one embodiment, the refracted rays may be combined with one or more outer scenery images. As such, an overlapped image of the generated image (i.e., from the refracted rays) and outer scenery may be formed. In one embodiment, the target may be a user's eye.

At step 420, the image is moved. In one embodiment, the image is moved in relation to the target. In another embodiment, the image is moved independent of any displacement of the projection system in relation to the target.

In one embodiment, moving the image may include rotating the image. For example, the image may be rotated by a rotating prism. In such an example, the rotating prism may be disposed in the projection system, and the rotating prism may be a Pechan prism, a dove prism, an Abbe prism, an Abbe-Koenig prism, a Schmidt prism, a delta prism, a right-angle prism, a penta prism, or a Porro prism. Additionally, the image may be rotated by rotating the rotating prism. As another example, the image may be rotated by the image generator. In such an example, the image may be rotated by rotating the image generator. As a further example, the image may be rotated by reassigning one or more pixels in the plurality of rays. In such an example, the pixels may be reassigned by the image generator.

In one embodiment, moving the image may include vertically displacing the image. In one embodiment, the image may be vertically displaced by vertically displacing the refracted rays. For example, the refracted rays may be vertically displaced by a steering mirror disposed in the projection system.

In one embodiment, moving the image may include horizontally displacing the image. In one embodiment, the image may be horizontally displaced by horizontally displacing the refracted rays. For example, the refracted rays may be horizontally displaced by a steering mirror disposed in the projection system.

In one embodiment, moving the image may include any suitable combination of rotating the image, vertically displacing the image, and/or horizontally displacing the image.

At step 424, the method ends. The steps illustrated in FIG. 4 may be combined, modified, or deleted where appropriate. Additional steps may also be added to the example operation. For example, the method may further include focusing the image by translatably moving at least one of a plurality of lens in the objective lens in relation to at least a second of the lenses. Furthermore, the described steps may be performed in any suitable order. Additionally, one or more of the steps may be performed at substantially the same time (or even the same time) as other steps illustrated.

In accordance with particular embodiments, the present disclosure may include a compact imaging system utilizing an illumination source. In one embodiment, the compact imaging system may include an image generator wherein the generated rays pass through an imaging lens. In a further embodiment, said rays may further propagate to a partially reflecting mirror constituting a second part of said imaging system. In another embodiment, said partially reflecting mirror may reflect said rays to form an image.

According to one embodiment, said image generator may be rotated at an angle resulting in the formation of an erect image at the target independent of the angular roll disposition of the imaging system. In a further embodiment, one or more pixel contents in said image generator may be reassigned resulting in the formation of a predominantly erect image at the target independent of the angular roll disposition of the imaging system.

In accordance with further embodiments, the present disclosure may include a compact imaging system utilizing an illumination source and an image generator, wherein the generated rays pass through an imaging lens then pass through a rotating prism. In one embodiment, the image may be rotated. In another embodiment, said rays may further propagate to a partially reflecting mirror constituting a second part of said imaging system. In an additional embodiment, said partially reflecting mirror may reflect said rays to form an image.

According to one embodiment, the rotating prism may be rotated at an angle resulting in the formation of an erect image at the target independent of the angular roll disposition of the imaging system. In a further embodiment, the rotating prism may be either a Pechan prism, dove prism, Abbe prism, Abbe-Koenig prism, Schmidt (or delta) prism, right-angle prism, penta prism or Porro prism. In additional embodiments, the rotating prism may be another prism that may rotate the image so that an erect image is formed at the target independent of the angular roll disposition of the imaging system.

In further embodiments, said partially reflective mirror may reflect a fraction of said image rays due to spectral coating of its inward looking surface. According to particular embodiments, said partially reflective mirror may transmit a fraction of the outer illumination to the system due to spectral coating of its inward looking surface and broadband antireflective coating of its outward looking surface. In other embodiments, said partially reflective mirror may reflect a fraction of said image rays due to polarization preference of its inward looking surface. In further embodiments, said partially reflective mirror may transmit a fraction of the outer illumination to the system due to polarization preference of its inward looking surface and broadband or narrow-band antireflective coating of its outward looking surface. In another embodiment, said partially reflective mirror may serve as an eyepiece. In a further embodiment, said partially reflective mirror may transmit a fraction of the outer illumination to the system aligned with the said image rays such as to form an overlapped image of the outer scenery and the generated image on the target. According to additional embodiments, said partially reflective mirror may transmit a fraction of the outer illumination to the system aligned with the said image rays, where said rotating prism can be rotated so as to form an erect image on the target overlapping the outer scenery.

In accordance with further embodiments, the present disclosure may include a compact imaging system utilizing an illumination source and an image generator, wherein the generated rays pass through an imaging lens then pass through a rotating prism. In one embodiment, the image may be rotated. In another embodiment, said rays may further propagate to a flat steering mirror. In a further embodiment, said rays may further propagate to a partially reflecting mirror constituting a second part of said imaging system and said partially reflecting mirror may reflect said rays to form an image. In one embodiment, the steering mirror may be adjusted at a solid angle steering said rays to said partially reflecting mirror. In a further embodiment, the steering mirror may be adjusted at a solid angle steering said rays such as to form an image at the target.

In accordance with additional embodiments, the present disclosure may include a compact imaging system utilizing an illumination source and an image generator, wherein the generated rays pass through an imaging lens. In one embodiment, said imaging lens may consist of a lens group. In another embodiment, said rays may pass through a rotating prism. In a further embodiment, the image may be rotated. In additional embodiments, said rays may further propagate to a flat steering mirror and said rays may further propagate to a partially reflecting mirror constituting a second part of said imaging system. In another embodiment, said partially reflecting mirror may reflect said rays to form an image.

According to one embodiment, said lens may comprise a plurality of singlet lens elements. In another embodiment, said lens may comprise a plurality of singlet lens elements and prisms. In an additional embodiment, said lens may comprise a plurality of singlet lens elements and prisms and diffractive elements. In further embodiments, the lens group and the partially steering reflecting mirror may form a catadiotric zoom system. In another embodiment, at least one singlet lens of said lens group may be translated. In an additional embodiment, said translatable singlet lens of said lens group may be translated so that an in-focus image is formed at the target independent of the distance from said lens group to said partially reflective mirror within certain bounds. According to particular embodiments, said translatable singlet lens of said lens group and said partially reflective mirror may constitute a catadioptric zoom system within a range of at least 0.1×-6×.

According to further embodiments, said rotating prism may be rotated at an angle resulting in the formation of an erect image at the target independent of the angular roll disposition of the imaging system, and wherein the steering mirror may be adjusted at a solid angle steering said rays such as to form an image at the target, and wherein said translatable singlet lens of said lens group may be translated so that an in-focus image is formed at the target independent of the distance from said lens group to said partially reflective mirror within certain bounds. In another embodiment, the imaging system may consist of a HUD architecture. In an additional embodiment, the imaging system may consist of a HMD architecture.

Although the embodiments in the disclosure have been described in detail, numerous changes, substitutions, variations, alterations, and modifications may be ascertained by those skilled in the art. Similarly, where appropriate, the appended claims encompass all changes, substitutions, variations, alterations, and modifications to the example embodiments described herein that a person having ordinary skill in the art would comprehend.

To aid the Patent Office and any readers of any patent issued on this application and interpreting the claims appended hereto, Applicants wish to note that they do not intend any of the appended claims to invoke Paragraph 6 of 35 U.S.C. §112 as it exists on the date of filing hereof unless "means for" or "step for" are used in the particular claim.

What is claimed is:

1. A system, comprising:
   a projection system;
   an image generator disposed in the projection system, the image generator operable to generate a plurality of rays;
   an objective lens disposed in the projection system, the objective lens operable to refract the plurality of rays;
   a rotating member disposed between the objective lens and a component operable to reflect the refracted rays onto a target in order to form an image;
   wherein the rotating member is operable to rotate the image at the target independent of an angular roll disposition of the projection system.

2. The system of claim 1, wherein the the rotating member comprises a rotating prism, the rotating prism operable to rotate inside of the projection system, and, as the rotating prism rotates, the rotating prism is further operable to rotate the image by rotating the refracted rays.

3. The system of claim 2, wherein the rotating prism is selected from one of:
   a Pechan prism;
   a dove prism;
   an Abbe prism;
   an Abbe-Koenig prism;
   a Schmidt prism;
   a delta prism;
   a right-angle prism;
   a penta prism; and
   a Porro prism.

4. The system of claim 1, wherein the system further comprises a steering mirror disposed, between the rotating member and the component operable to reflect the refracted rays onto a target, the steering mirror operable to displace the image on the target, the displacement of the image being independent of any displacement of the projection system in relation to the target.

5. The system of claim 1, wherein the objective lens comprises a plurality of lens elements, wherein at least one of the lens elements is operable to translatably move in relation to at least a second of the lens elements, and wherein the movement of the at least one of the lens elements is operable to focus the image.

6. The system of claim 5 wherein the at least one of the lens elements and the component operable to reflect the refracted rays comprise a catadioptric zoom lens system having a magnification range of at least 0.1× to 6×.

7. The system of claim 5 wherein the plurality of lens elements comprises at least one lens element disposed off-axis relative to a chief ray.

8. The system of claim 1, wherein the projection system comprises a Head-Up Display (HUD) projection system and the target comprises an eye of a user.

9. The system of claim 1, wherein the image comprises multiple wavelengths having different bandwidths.

10. The system of claim 1, wherein the component is further operable to transmit illumination from outer scenery to the target so as to form an overlapping image that includes the image and the outer scenery.

11. The system of claim 10, wherein the image comprises wavelengths of 525 nanometers with a broadband spectrum of 50 nm Full-Width Half-Maximum, and the outer scenery comprises wavelengths anywhere within a visible spectrum.

12. The system of claim 10, wherein both the image and the outer scenery comprise wavelengths anywhere within a visible spectrum, wherein the wavelengths of the image are complementary to the wavelengths of the outer scenery.

13. The system of claim 1, wherein the objective lens comprises a zoom lens.

14. The system of claim 13, wherein the zoom lens is configured to compensate for a misalignment at a magnification factor in the range between 0.1× and 6×.

15. A method comprising:
generating, by an image generator disposed in a projection system, a plurality of rays; refracting, by an objective lens disposed in the projection system, the plurality of rays;
reflecting, by a component, the refracted rays onto a target in order to form an image; and
rotating the image at the target wherein the rotation of the image is independent of an angular roll disposition of the projection system.

16. The method of claim 15, wherein the rotating the image comprises rotating the refracted rays by rotating a rotating prism disposed inside of the projection system.

17. The method of claim 16, wherein the rotating prism is selected from one of:
a Pechan prism;
a dove prism;
an Abbe prism;
an Abbe-Koenig prism;
a Schmidt prism;
a delta prism;
a right-angle prism;
a penta prism;
and a Porro prism.

18. The method of claim 15, wherein the rotating the image comprises rotating the plurality of rays by rotating the image generator.

19. The method of claim 15 further comprising displacing the image on the target, wherein the displacement is independent of any displacement of the projection system in relation to the target, the displacement by a steering mirror disposed in the projection system.

20. The method of claim 15, wherein the objective lens comprises a plurality of lens elements; and the method of claim 15 further comprises focusing the image by translatably moving at least one of the lens elements in relation to at least a second of the lens elements.

21. The method of claim 15, wherein the projection system comprises a Head-Up Display (HUD) projection system and the target comprises an eye of a user.

22. The method of claim 15 further comprising transmitting, by the component, illumination from outer scenery to the target so as to form an overlapping image that includes the image and the outer scenery, wherein the image comprises wavelengths of 525 nanometers with a broadband spectrum of 50 nm Full-Width Half-Maximum, and the outer scenery comprises wavelengths anywhere within a visible spectrum.

23. The method of claim 22, wherein both the image and the outer scenery comprise wavelengths anywhere within a visible spectrum, wherein the wavelengths of the image are complementary to the wavelengths of the outer scenery.

24. The method of claim 22, wherein the image comprises multiple wavelengths having different bandwidths.

25. A system, comprising:
a projection system;
an image generator disposed in the projection system, the image generator operable to generate a plurality of rays;
an objective lens disposed in the projection system, the objective lens operable to refract the plurality of rays;
a component operable to reflect the refracted rays onto a target in order to form an image,
wherein the component is further operable to transmit illumination from outer scenery to the target so as to form an overlapping image that includes the image and the outer scenery,
wherein both the image and the outer scenery comprise wavelengths anywhere within a visible spectrum,
wherein the wavelengths of the image are complementary to the wavelengths of the outer scenery,
wherein the image is operable to be moved in relation to the target, the movement of the image being independent of any displacement of the projection system in relation to the target,
wherein the movement of the image comprises a rotation of the image,
a rotating prism disposed in the projection system, the rotating prism operable to rotate inside of the projection system, and, as the rotating prism rotates, the rotating prism is further operable to rotate the image by rotating the refracted rays,
wherein the rotating prism is selected from one of:
a Pechan prism;
a dove prism;
an Abbe prism;
an Abbe-Koenig prism;
a Schmidt prism;
a delta prism;
a right-angle prism;
a penta prism; and
a Porro prism;
wherein the movement of the image further comprises a vertical displacement of the image;
wherein the system further comprises a steering mirror disposed in the projection system, the steering mirror operable to vertically displace the image by vertically displacing the refracted rays;
wherein the movement of the image further comprises a horizontal displacement of the image;
wherein the steering mirror is further operable to horizontally displace the image by horizontally displacing the refracted rays;
wherein the objective lens comprises a plurality of lenses;
wherein at least one of the lenses is operable to translatably move in relation to at least a second of the lenses; and wherein the movement of the at least one of the lenses is operable to focus the image; and wherein the projection system comprises a Head-Up Display (HUD) projection system and the target comprises an eye of a user.

26. The system of claim 25 wherein the objective lens comprises a plurality of lens elements, wherein at least one of the lens elements is operable to translatably move in relation to at least a second of the lens elements, and wherein the movement of the at least one of the lens elements is operable to focus the image.

* * * * *